United States Patent [19]

Reko

[11] Patent Number: 5,482,416
[45] Date of Patent: Jan. 9, 1996

[54] METAL WORKING MACHINE

[75] Inventor: Steve Reko, Oldcastle, Canada

[73] Assignee: Reko International Group Inc., Ontario, Canada

[21] Appl. No.: 268,500

[22] Filed: Jun. 30, 1994

[51] Int. Cl.$^6$ ............................. B23Q 5/40; F16H 27/02
[52] U.S. Cl. .................. 409/238; 74/89.15; 74/424.8 R; 82/141
[58] Field of Search ................................. 409/238, 235, 409/187; 82/163, 141; 74/89.15, 424.8 R; 408/137

[56] References Cited

U.S. PATENT DOCUMENTS

| | | | |
|---|---|---|---|
| 3,643,532 | 2/1972 | Moss | 82/141 |
| 3,670,583 | 6/1972 | Leming | 74/89.15 |
| 4,440,038 | 4/1984 | Potter | 74/424.8 R |
| 4,572,014 | 2/1986 | Kluczynski | 74/89.15 |
| 4,932,279 | 6/1990 | Kasuga | 74/424.8 R |
| 5,251,501 | 10/1993 | Katahira | 74/89.15 |
| 5,425,607 | 6/1995 | Hardesty | 409/238 |

FOREIGN PATENT DOCUMENTS

| | | | |
|---|---|---|---|
| 127938 | 7/1985 | Japan | 74/89.15 |
| 72254 | 3/1990 | Japan | 74/89.15 |
| 150538 | 6/1990 | Japan | 74/89.15 |

OTHER PUBLICATIONS

A catalogue of Zayer, Vitoria, Spain, entitled: "Fixed Table and Floor Type Traveling Column Milling Machines with Numerical Control KM-KC, Electronic Copying Machines KM-KC-BFC, Machining Centers KMU-KCU"; pp. 10 and 11.

*Primary Examiner*—William Briggs
*Attorney, Agent, or Firm*—Fish & Richardson

[57] ABSTRACT

A vertical milling or boring machine has a tool head supporting column which rides on base mounted rails. A ball, screw extends along the base under the column. Each column has a motor driving a nut carried by the ball screw. The nut is caged by the column so that rotation of the nut moves the column along the rails. To prevent ball screw droop, a slidable block is provided on either side of the column which operate as follows. The column pulls one of the these supports along until it latches to a post proximate the middle of the ball screw whereupon this latch overcomes the connection between the column and the slidable support leaving the slidable support latched to the post. When coming back the other way, the column pulls the other slidable support. The column pushes the first support off the post and latches to the first support when the column encounters the first support and leaves the other slidable support latched to the post once the column passes the post. A counterbalance for the tool head comprises three shafts arranged in a triangular configuration, a pulley support mounted for sliding along the shafts, a link from the tool head around the pulley of the pulley support, and an hydraulic cylinder bearing against the pulley support for applying the force to it in order to counterbalance the weight of the tool head.

10 Claims, 4 Drawing Sheets

5,482,416

METAL WORKING MACHINE

BACKGROUND OF THE INVENTION

1. Field of the Invention

This invention relates to a metal working machine with a movable tool.

2. Description of the Related Art

Large scale milling, boring, and electrical discharge machinery is used when working on large metal workpieces. One example of a large scale metal working machine is a vertical milling or boring machine.

Metal working generally requires great precision and this is difficult to achieve with the heavy machinery required to work large metal workpieces.

This invention seeks to overcome drawbacks of known metal working machines.

SUMMARY OF THE INVENTION

In accordance with this invention, there is provided a metal working machine with a moveable tool, comprising: a base; rail means extending along said base; screw means extending along said base; a tool support carried by said rail means, said tool support having means operatively engaging said screw means for translating said tool support on said rail means; a first support for said screw means slidably received on said base to one side of said tool support; a second support for said screw means slidably received on said base to another side of said tool support; said tool support having means at said one side for releasably coupling to said first support and means at said another side for releasably coupling to said second support; means for decoupling said first support from said tool support at a screw means supporting position when said tool support is translating along said rail means and said first support is trailing said tool support; and means for decoupling said second support from said tool support at a screw means supporting position when said tool support is translating along said rail means and said second support is trailing said tool support.

BRIEF DESCRIPTION OF THE DRAWINGS

In the Figures which disclose example embodiments of the invention.

DETAILED DESCRIPTION OF THE PREFERRED EMBODIMENTS

Figure 1:
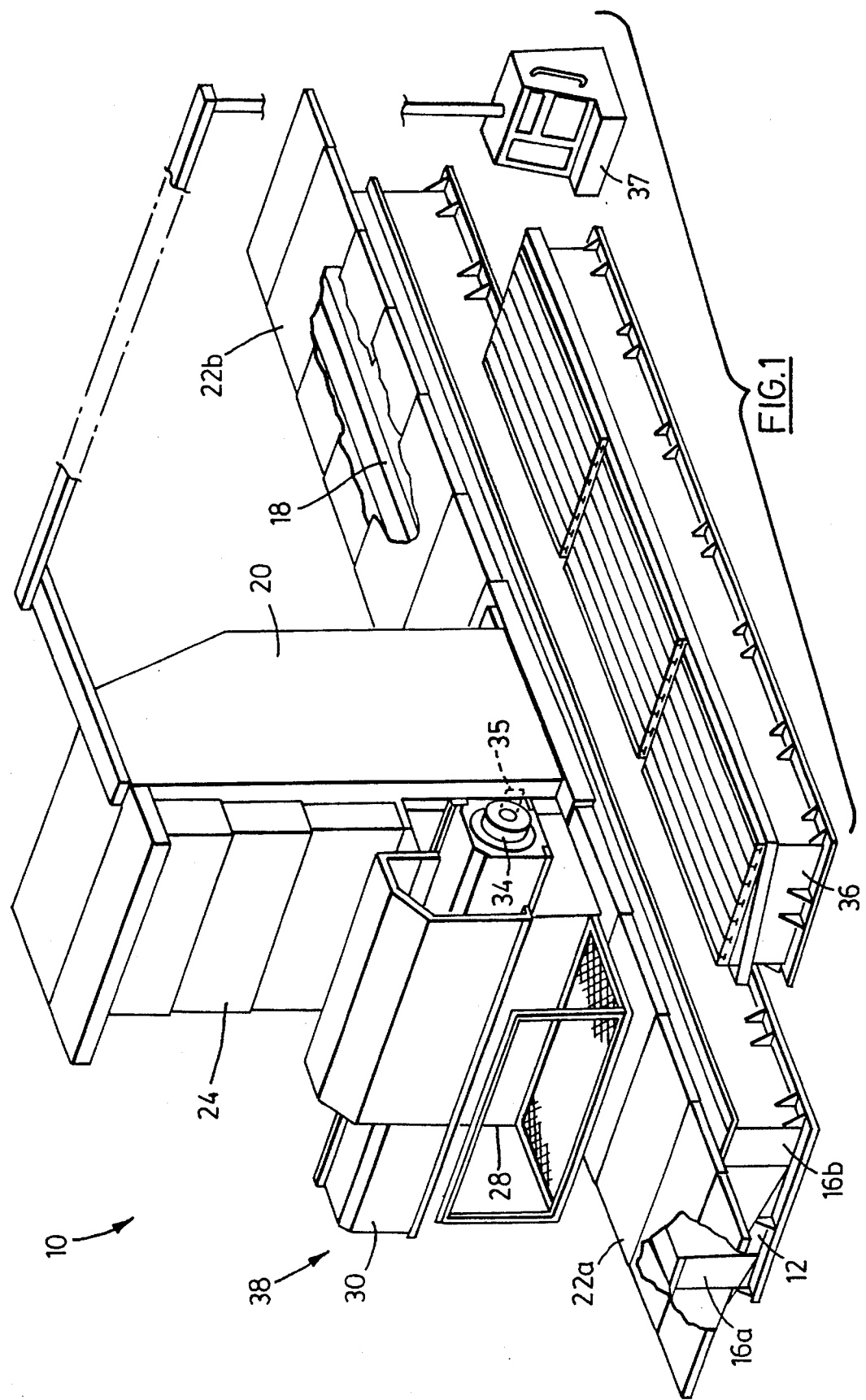
FIG. 1 is a partially broken away perspective view of a vertical metal working machine made in accordance with this invention.

Turning to FIG. 1 a metal working machine generally indicated at 10 comprises a base having a pad 12. Pad 12 has a pair of ways, or rails, 16a, 16b, respectively. Pad 12 also has a ball screw 18 extending therealong. A column 20 is supported on pad 12. Telescoping plates 22a extend between the column and one end of pad 12 and telescoping plates 22b extend between the column and the other end of the pad. A primary block 28 is vertically slidably supported on the column; telescoping plates 24 house the sliding support mechanism for the primary block. A secondary block 30 is horizontally slidably supported on block 28. A tool chuck 34 depends from the secondary block 30. The primary block 28, secondary block 30, and tool chuck 34 comprise a tool head 38. A tool, shown is phantom at 35, may be taken up by the tool chuck. The column 20 therefore acts as a tool support, as does the tool head 38. A work table 36 is provided adjacent base pad 12 for supporting a workpiece (not shown) for working upon by the machine 10. An operator input 37 is operatively connected to the machine 10.

In overview, the machine 10 of FIG. 1 operates as follows. After a workpiece has been placed on work table 36, tool chuck 34 may be positioned longitudinally appropriately on the workpiece by moving column 20 along rails 16a, 16b utilising ball screw 18. Telescoping plates 22a, 22b telescope to extend or retract as the column moves so that the ball screw is housed at all times. Next tool head 38 may be moved vertically on column 20 in order to position tool chuck 34 at a selected vertical position on the workpiece; telescoping plates 24 telescope as the tool head moves so that the mechanism for moving the tool head in column 20 is housed at all times. Lastly, secondary block 30 may be moved laterally so that a tool within the chuck 34 cuts the workpiece as required.

Figure 2:
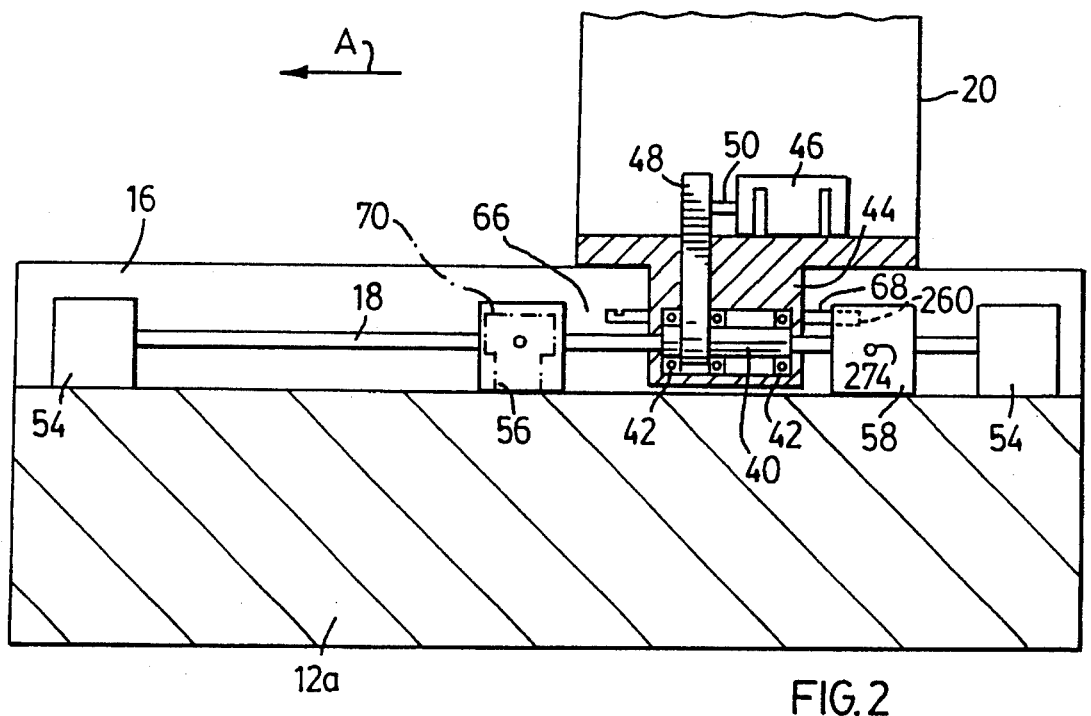
FIG. 2 is a side sectional view of a portion of FIG. 1.

Turning to FIG. 2, a ball nut 40 engages ball screw 18. As will be apparent to those skilled in the art, a ball screw has a spiralling ball race and a ball nut has ball bearings which engage the ball race. Nut 40 is mounted by bearings 42 within a cage 44 depending from column 20. A motor 46 is mounted to the column 20 and a belt 48 couples the output shaft 50 of the motor and the ball nut 40. With reference to both FIGS. 2 and 3, cage 44 has a notched finger 66 projecting from one of its sides and a notched finger 68 projecting from its opposite side. Ball screw 18 is end-mounted by fixed blocks 54. In addition, ball screw 18 is supported by slidable support blocks 56 and 58. Slidable block 56 is positioned to one side of cage 44 of column 20 and slidable block 58 is positioned to the opposite side of the cage 44.

Figure 3:
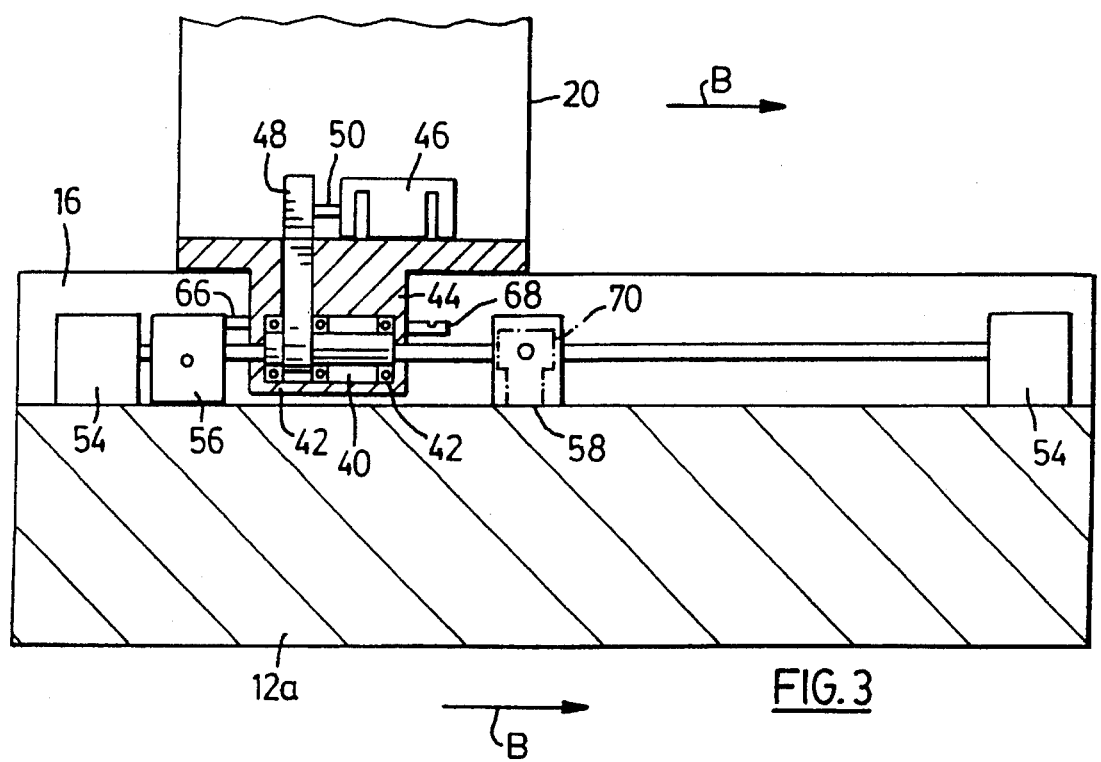
FIG. 3 is a side sectional view of the machine of FIG. 1 shown in another position.
Figure 4:
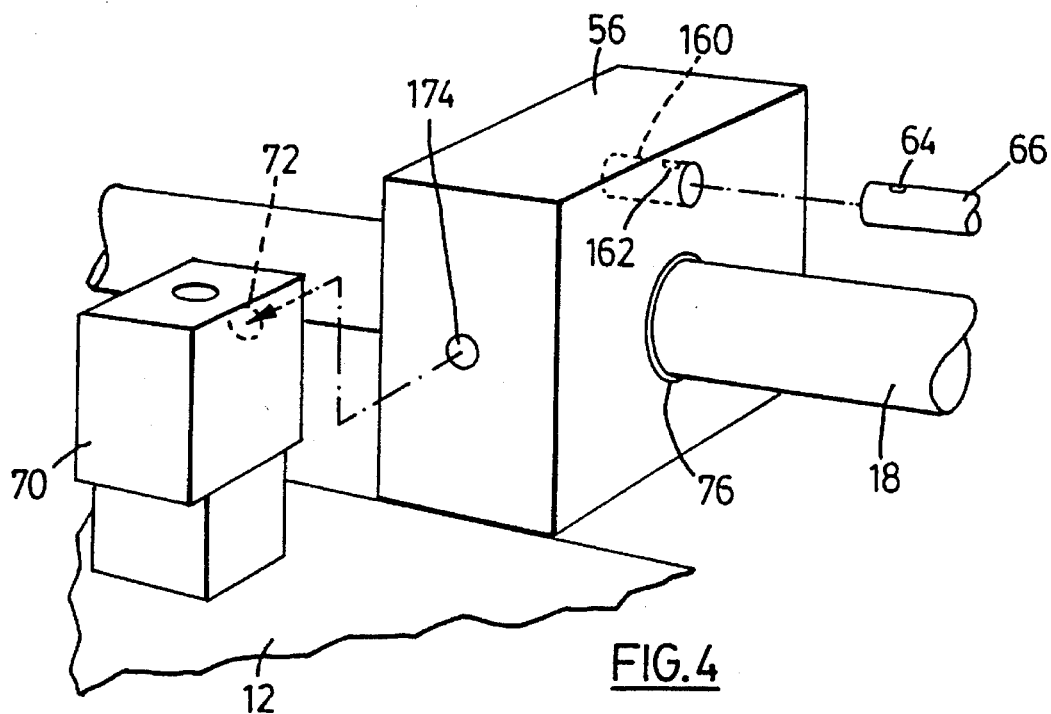
FIG. 4 is a perspective fragment of a portion of the machine of FIG. 1.

With reference to FIG. 4 as well as FIGS. 2 and 3, sliding block 56 has a receptor 160 sized to receive finger 66 and a spring-loaded detent 162 sized for capturing the notch 64 in finger 66. The base pad 12 has a post 70 positioned approximately midway between the fixed end supports 54 for the ball screw 18. Post 70 has an indent 72 facing ball screw 18. Sliding block 56 has a spring-loaded detent 174 positioned such that when the sliding block is registered with post 70, spring-loaded detent 174 enters indent 72 to latch the sliding block to the post. Spring-loaded detent 174 is designed to provide a greater holding force than that available through spring-loaded detent 62. As will be apparent from FIG. 4, slidable block 56 has an opening 76 which is of slightly larger diameter than ball screw 18 such that the slidable block 56 may support the ball screw while still being free to slide along the ball screw.

Slidable block 58 has a receptor 260 (FIG. 2) similar to receptor 160 for coupling to notched finger 68 and a detent 274 (FIG. 2) similar to detent 174 for latching to the indent 72 of post 70. Slidable block 58 also has an opening sized to allow it to slide along ball screw 18.

The portions of the machine described in conjunction with FIGS. 2 to 4 permit the movement of the column, as follows. Motor 46 of the column may be activated in order to cause belt 48 to turn bearing supported nut 40. This causes the nut 40 to travel along the ball screw 18. However, since nut 40 is captured within cage 44, the column is constrained to move with the nut. Thus, by activating motor 46, the column may be moved along the ball screw 18.

The vertical boring machine may be very long such that the ball screw may be twenty-six feet in length or more. Such a long ball screw would droop in the middle if supported only by fixed blocks 54. If this occurred, nut 40 would bind on the ball screw, potentially destroying the screw or the nut. Slidable blocks 56 and 58 are provided to avoid ball screw droop; they operate as follows. Firstly, assuming a starting position as shown in FIG. 2, with notched finger 68 coupling slidable block 58 to column 20 and slidable block 56 latched by post 70, motor 46 is operated to move the column 20 in direction A. This pulls trailing slidable block 58 along with the column. When the notched finger 66 reaches slidable block 56 it latches in receptor 160 of slidable block 56 and thereafter further movement of column 20 in direction A pushes block 56 in this direction. This pushing force overcomes spring-loaded detent 174, dislodging the slidable block 56 from post 70. As the column continues in direction A, the spring-loaded detent 274 of trailing sliding block 58 engages indent 72. The latching force between the post and slidable block 58 is sufficient to overcome the spring-loaded detent within receptor 260, such that finger 68 pulls out of receptor 260 of slidable block 58 as the column continues in direction A. FIG. 3 indicates this result with slidable block 56 coupled to finger 66 and slidable block 58 latched by post 70. It will be apparent that slidable block 58 will remain latched to post 70 until such time as column 20 moves in direction B (FIG. 3) for a sufficient distance such that finger 68 engages the slidable block 58 and then dislodges it from post 70. In this way, one or other of slidable blocks 56 and 58 are always proximate the middle of ball screw 18 and, therefore, prevent ball screw droop.

Figure 5:
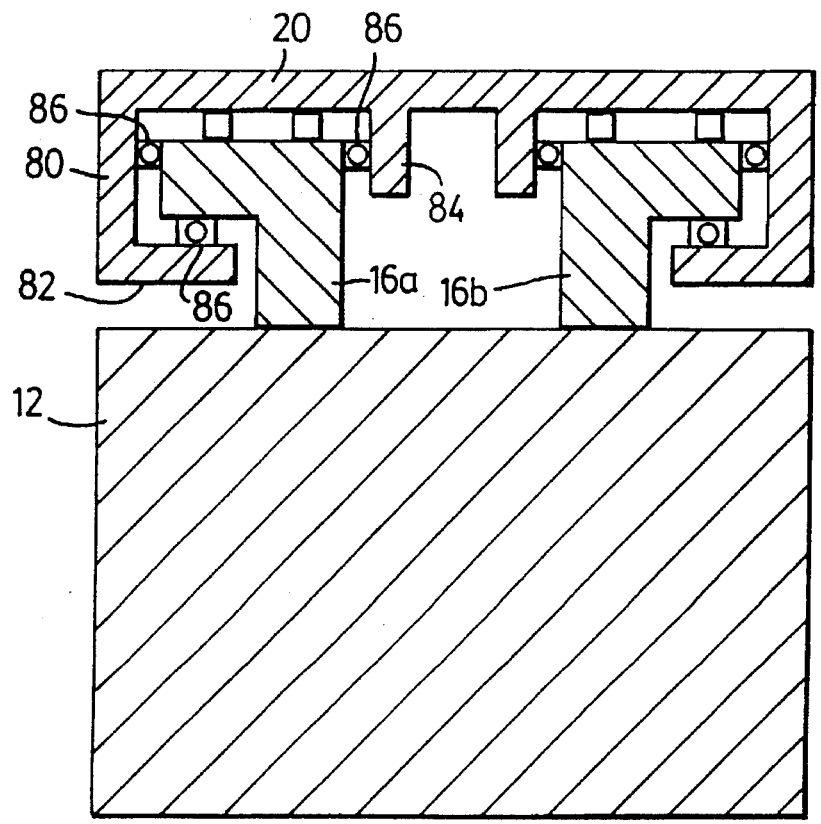
FIG. 5 is a front cross-sectional view of a portion of FIG. 1.

Turning to FIG. 5, it will be apparent that each rail of the pair of rails 16a, 16b has an inverted L-shaped cross-section. Column 20 has a leg 80, a foot 82, and an arm 84 which surrounds each rail. Bearings 86 are attached to column 20 to space the column laterally and vertically on the rail.

Figures 6, 6A:
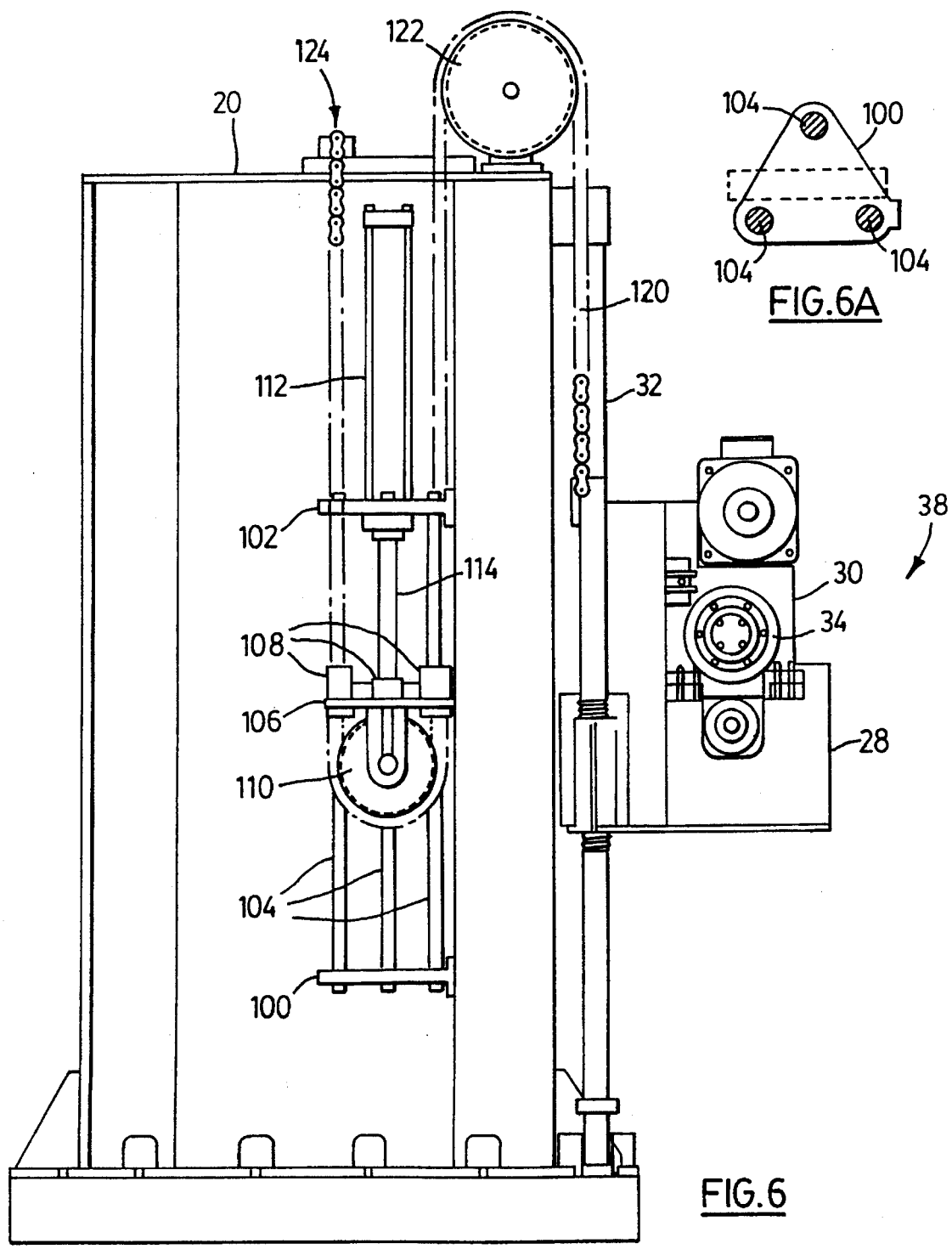
FIG. 6 is a side view of portion of the machine of FIG. 1.
FIG. 6a is a top view of a portion of FIG. 6.

Turning to FIG. 6 (which is a side view of column 20 with its coverings removed, and of the tool head 38) and FIG. 6a (which is a plan view of a portion of FIG. 6), feet 100 and 102 depend from column 20 and support shafts 104. As seen in FIG. 6a, the shafts 104 are mounted in the feet so as to define the apices of a notional equilateral triangle. A pulley support 106 has linear bearings 108 which slidably mount the pulley support to shaft 104. Pulley support 106 supports pulley 110. An hydraulic cylinder 112 is mounted to foot 102 and has a piston 114 which acts against the pulley support 106. A chain link 120 extends from tool head 38 around pulley 122 and around pulley 110 to a mounting point 124 on column 20.

With this arrangement, when piston 114 of hydraulic cylinder 112 is extended, pulley 110 is moved downwardly which moves tool head 38 upwardly. Thus, a static force may be applied by way of hydraulic cylinder 112 in order to counterbalance the weight of the tool head 38. Any torsional forces imparted on pulley 110 and platform 106 are absorbed by shafts 104.

Modifications will be apparent to those skilled in the art and, therefore, the invention is defined in the claims.

What is claimed is:

1. A metal working machine with a moveable tool, comprising:

a base;

rail means extending along said base;

screw means extending along said base;

a tool support carried by said rail means, said tool support having means operatively engaging said screw means for translating said tool support on said rail means;

a first support for said screw means slidably received on said base to one side of said tool support;

a second support for said screw means slidably received on said base to another side of said tool support;

said tool support having means at said one side for releasably coupling to said first support and means at said another side for releasably coupling to said second support;

means for decoupling said first support from said tool support at a screw means supporting position when said tool support is translating along said rail means and said first support is trailing said tool support; and means for decoupling said second support from said tool support at a screw means supporting position when said tool support is translating along said rail means and said second support is trailing said tool support.

2. The machine of claim 1 wherein said releasable coupling means for said first support comprises an arm, said first support has an arm latch, said releasable coupling means for said second support comprises an arm, and said second support has an arm latch.

3. The machine of claim 2 wherein said means for decoupling said first support and said means for decoupling said second support comprise engagement means depending from said base for engaging said first support and overcoming said means for releasably coupling said first support when said tool support is translating along said rail means and said first support is trailing said tool support and for engaging said second support and overcoming said means for releasably coupling said second support when said tool support is translating along said rail means and sail second support is trailing said tool support.

4. The machine of claim 3 wherein said rail means comprises a rail with an inverted L-shaped cross-section and wherein said tool support substantially surrounds said rail.

5. The machine of claim 4 including rollers between said rail means and said tool support.

6. The machine of claim 1 wherein said means operatively engaging said screw means comprises a nut engaging said screw and rotatably supported by said tool support and a motor mounted to said tool support and operatively connected to said nut for rotating said nut.

7. The machine of claim 6 wherein said screw means comprises a ball screw and wherein said nut comprises a ball nut.

8. The machine of claim 1 wherein said tool support comprises a tool head mounted for vertical movement and a counterbalance for said tool head comprising an hydraulic cylinder having a piston for opposing the weight of said tool head.

9. The machine of claim 8 wherein said counterbalance includes an abutment mounted to said piston of said hydraulic cylinder, a link between said abutment and said tool head, and at least three shafts mounted in alignment with said piston, said abutment being slidably mounted to said shafts, whereby torsional forces applied to said abutment by said link are absorbed by said shafts.

10. The machine of claim 9 wherein said shafts ace mounted in a relationship which defines the apices of a notional equilateral triangle.

* * * * *

UNITED STATES PATENT AND TRADEMARK OFFICE
CERTIFICATE OF CORRECTION

PATENT NO. :   5,482,416
DATED      :   January 9, 1996
INVENTOR(S) :  Steve Reko It is certified that error appears in the above—identified patent and that said Letters Patent is hereby corrected as shown below:

Claim 10, column 4, line 63, cancel "ace" and insert --are--.

Signed and Sealed this

Fifteenth Day of October, 1996

*Attest:*

BRUCE LEHMAN

*Attesting Officer*    *Commissioner of Patents and Trademarks*